(12) United States Patent
Sato et al.

(10) Patent No.: US 9,059,620 B2
(45) Date of Patent: Jun. 16, 2015

(54) INVERTER AND INTEGRATED-INVERTER ELECTRIC COMPRESSOR

(75) Inventors: Hidetaka Sato, Aichi (JP); Koji Nakano, Aichi (JP); Kazunori Teshima, Aichi (JP); Takashi Nakagami, Aichi (JP); Koji Toyama, Hiroshima (JP); Takeshi Hirano, Aichi (JP); Takayuki Watanabe, Aichi (JP); Naoto Kunieda, Aichi (JP)

(73) Assignee: MITSUBISHI INDUSTRIES LTD., Tokyo (JP)

( * ) Notice: Subject to any disclaimer, the term of this patent is extended or adjusted under 35 U.S.C. 154(b) by 303 days.

(21) Appl. No.: 13/062,341

(22) PCT Filed: Feb. 4, 2010

(86) PCT No.: PCT/JP2010/051576
§ 371 (c)(1),
(2), (4) Date: Mar. 4, 2011

(87) PCT Pub. No.: WO2010/092896
PCT Pub. Date: Aug. 19, 2010

(65) Prior Publication Data
US 2011/0163705 A1 Jul. 7, 2011

(30) Foreign Application Priority Data
Feb. 10, 2009 (JP) ................................. 2009-028593

(51) Int. Cl.
*H02P 6/00* (2006.01)
*H02P 27/06* (2006.01)
(Continued)

(52) U.S. Cl.
CPC .......... *H02K 11/0073* (2013.01); *H02K 11/024* (2013.01); *H02M 1/126* (2013.01); *H02M 7/003* (2013.01)

(58) Field of Classification Search
USPC .............. 318/400.24, 722, 494; 417/410, 411
See application file for complete search history.

(56) References Cited

U.S. PATENT DOCUMENTS

2003/0200761 A1   10/2003   Funahashi et al.
2008/0116838 A1*  5/2008   Hattori et al. ................. 318/722
(Continued)

FOREIGN PATENT DOCUMENTS

JP   2001-285010 A   10/2001
JP   2003-322082 A   11/2003
(Continued)

OTHER PUBLICATIONS

Decision to Grant a Patent dated Nov. 5, 2013, issued in Japanese application No. 2009-028593. Explanation of Relevancy—"The Decision to Grant a Patent has been received".
International Search Report of PCT/JP2010/051576, date of mailing Apr. 27, 2010.

*Primary Examiner* — Eduardo Colon Santana
*Assistant Examiner* — Iftekhar Mustafa
(74) *Attorney, Agent, or Firm* — Westerman, Hattori, Daniels & Adrian, LLP

(57) ABSTRACT

In an inverter in which noise reducing coils and a smoothing capacitor are provided on a power line to an inverter module to achieve a no-busbar configuration, simplification of the manufacturing process, reduction of the influence on the size of the inverter, enhanced noise reducing function, reduction in cost and so on, the smoothing capacitor is electrically connected, on the inverter module, to the power line in parallel with a power system board, and the noise reducing coils are connected to the power line by directly connecting output lead wires thereof to P-N terminals of the inverter module.

7 Claims, 9 Drawing Sheets

(51) Int. Cl.
*H02K 11/00* (2006.01)
*H02K 11/02* (2006.01)
*H02M 1/12* (2006.01)
*H02M 7/00* (2006.01)

(56) References Cited

U.S. PATENT DOCUMENTS

2008/0116996 A1* 5/2008 Wasaki et al. .................. 333/175
2009/0140680 A1* 6/2009 Park ............................... 318/438
2010/0014988 A1  1/2010 Tsutsui et al.

FOREIGN PATENT DOCUMENTS

| JP | 2004190547 | * | 7/2004 |
| JP | 2004-335625 | A | 11/2004 |
| JP | 2005-161940 | A | 6/2005 |
| JP | 2005161940 | * | 6/2005 |
| JP | 3827158 | B2 | 9/2006 |
| JP | 2006-316755 | A | 11/2006 |
| JP | 2007-181316 | A | 7/2007 |
| JP | 2008-193814 | A | 8/2008 |
| JP | 2008-252962 | A | 10/2008 |

* cited by examiner

INVERTER AND INTEGRATED-INVERTER ELECTRIC COMPRESSOR

TECHNICAL FIELD

The present invention relates to an inverter suited for application to an electric compressor of a vehicle air conditioner and to an integrated-inverter electric compressor in which the inverter is incorporated.

BACKGROUND ART

Electric compressors in which an inverter that converts DC power supplied from a power unit to three-phase AC power and that applies the power to an electric motor via glass-sealed terminals is integrally incorporated is employed as compressors for air conditioners installed in electric cars and hybrid cars. These integrated-inverter electric compressors are generally configured such that an inverter accommodating section (inverter box) is provided on the periphery of a housing that accommodates an electric motor and a compression mechanism, in which the inverter is integrally incorporated.

The inverter includes high-voltage components, such as a common mode coil, a normal mode coil, and a smoothing capacitor (head capacitor) provided on power lines to reduce noise; a power system board on which a switching circuit constituted by semiconductor switching devices, such as IGBTs, is mounted and which converts DC power to three-phase AC power and applies the power to an electric motor; and a control board on which a control and communication circuit constituted by devices that operate at low voltage, such as a CPU, is mounted and which controls AC power to be applied to the electric motor, in which the power system board and the control board are modularized and incorporated in the inverter accommodating section on the periphery of the housing.

To improve the ease of installation in vehicles, it is preferable to reduce the size of integrated-inverter electric compressors, as well as inverters, as much as possible. In such inverters, electrical connections among the inverter module, the smoothing capacitor, the normal mode coil, and the common mode coil are generally made via a busbar assembly in which a plurality of relay busbars are integrated (for example, see Patent Literatures 1 and 2).

Furthermore, Patent Literature 3 discloses an inverter that is made compact by using a thin ceramic capacitor or film capacitor as a smoothing capacitor, accommodating it in an inverter module in which a power system board and a control board are integrated with the use of a module case, and providing a filter capacitor to reduce common mode noise on the base of the module case.

CITATION LIST

PATENT LITERATURE

{PTL 1} The Publication of Japanese Patent No. 3827158
{PTL 2} Japanese Unexamined Patent Application, Publication No. 2003-322082
{PTL 3} Japanese Unexamined Patent Application, Publication No. 2004-335625

SUMMARY OF INVENTION

Technical Problem

However, a configuration using the relay busbar has the problems of a complicated manufacturing process, such as the mounting process, due to an increase in solder portions, restrictions in mounting the inverter in terms of insulating performance (an increase in creeping distance), the influence of the volume of the relay busbar itself on the size of the inverter, a reduction in noise reducing function due to an increase in the distance to the inverter module, which is a noise source, and so on.

Furthermore, although the configuration disclosed in Patent Literature 3 can make the inverter compact by accommodating the smoothing capacitor and the filter capacitor in the inverter module, the electrical connections between the smoothing capacitor and the filter capacitor use a lead frame or a busbar, which cannot solve the above problems due to the use of the busbar.

The present invention is made in consideration of such circumstances, and an object thereof is to provide an inverter and an integrated-inverter electric compressor in which no busbar is used so that the manufacturing process can be simplified, the influence on the size of the inverter can be reduced, the noise reducing function can be enhanced, and the cost can be reduced.

Solution to Problem

To solve the problems described above, an inverter and an integrated-inverter electric compressor according to the present invention employ the following solutions.

Specifically, an inverter according to a first aspect of the present invention is an inverter in which a noise reducing coil and a smoothing capacitor are provided on power lines to an inverter module including a power system board that converts DC power supplied from a power source to AC power and supplies the AC power to an electric motor and a control board that controls the AC power to be applied to the electric motor, wherein the smoothing capacitor is electrically connected, on the inverter module, to the power lines in parallel with the power system board; and the noise reducing coil is connected to the power line by directly connecting an output lead wire thereof to P-N terminals of the inverter module.

According to the first aspect of the present invention, since the smoothing capacitor is electrically connected, on the inverter module, to the power line in parallel with the power system board, and the output lead wire of the noise reducing coil is connected to the power lines by directly connecting to the P-N terminals of the inverter module, the electrical connections among the inverter module, the smoothing capacitor, and the noise reducing coils can be made without a relay busbar by using the output lead wires of the noise reducing coils. This can therefore achieve a no-busbar configuration to simplify the manufacturing process, such as the mounting process, due to a decrease in solder portions, fewer restrictions in mounting the inverter in terms of insulating performance (an increase in creeping distance), reduction in the size of the inverter, and enhanced noise reducing function by reducing the distance to the inverter module, which is a noise source, and reduction of the cost by eliminating the busbar.

In the inverter according to the first aspect of the present invention, preferably, the noise reducing coil includes at least two coils, that is, a common mode coil and a normal mode coil, and is connected to the power lines by directly connecting individual output lead wires of the common mode coil and the normal mode coil to the P-N terminals of the inverter module.

With this configuration, since the noise reducing coil is composed of at least two coils, that is, the common mode coil and the normal mode coil, and is connected to the power lines by directly connecting individual output lead wires of the common mode coil and the normal mode coil to the P-N terminals of the inverter module, common mode noise can be reduced by providing the common mode coil as a noise reducing coil, and the electrical connections among the inverter module, the smoothing capacitor, the normal mode coil, and the common mode coil can be made without a relay busbar by using the output lead wires of the normal mode coil and the common mode coil. Accordingly, also in the case where the noise reducing coil is composed of at least two coils, that is, the common mode coil and the normal mode coil, the relay busbar can be eliminated to achieve a no-busbar configuration.

Furthermore, in the inverter according to the first aspect of the present invention, preferably, the normal mode coil is provided, downstream of the common mode coil, at each of the P-pole side and the N-pole side of the power lines and is connected to the power line by directly connecting individual output lead wires of the normal mode coil to the P-N terminals of the inverter module.

With this configuration, the normal mode coil is provided, downstream of the common mode coil, at each of the P-pole side and the N-pole side of the power lines and is connected to the power lines by directly connecting individual output lead wires of the normal mode coil to the P-N terminals of the inverter module. Therefore, also in the case where the normal mode coil is divided into two and provided, downstream of the common mode coil, at each of the P-pole side and the N-pole side of the power line, the electrical connections among the inverter module, the smoothing capacitor, and the normal mode coils can be made with a relay busbar by using the output lead wires of the normal mode coils. Accordingly, also in the case where the two-divided normal mode coils are provided downstream of the common mode coil, the relay busbar can be eliminated to achieve a no-busbar configuration.

Furthermore, in the inverter according to the first aspect of the present invention, preferably, the common mode coil and the normal mode coil are connected to the power lines by connecting two input lead wires of the common mode coil via a plurality of connection terminals provided at a terminal block to which power cables are connected and by electrically connecting the common mode coil and the normal mode coil.

With this configuration, since the common mode coil and the normal mode coil are connected to the power lines by connecting two input lead wires of the common mode coil via a plurality of connection terminals provided at a terminal block to which power cables are connected and by electrically connecting the common mode coil and the normal mode coil, the electrical connections among the inverter module, the smoothing capacitor, the normal mode coil, and the common mode coil can be made without a relay busbar by using the terminal block and the input and output lead wires of the coils. This can therefore completely eliminate the relay busbar between the terminal block to which the power cables are connected and the P-N terminals of the inverter module, thus achieving a no-busbar configuration.

Furthermore, in the inverter according to the first aspect of the present invention, preferably, the smoothing capacitor is disposed on the power system board, which, of the control board and the power system board disposed at the upper and lower positions in the inverter module, is the one disposed at the lower side.

With this configuration, since a flat thin-film capacitor in which, for example, plastic films are laminated, is used as the smoothing capacitor, and the smoothing capacitor is disposed on the power system board, which, of the control board and the power system board disposed at the upper and lower positions in the inverter module, is the one disposed at the lower side, the smoothing capacitor can be accommodated in the inverter module using the space between the upper control board and the lower power system board. This can therefore make the inverter more compact.

Furthermore, in the inverter according to the first aspect of the present invention, preferably, the smoothing capacitor is disposed on the control board, which, of the control board and the power system board disposed at the upper and lower positions in the inverter module, is the one disposed at the upper side.

With this configuration, since a flat thin-film capacitor in which, for example, plastic films are laminated, is used as the smoothing capacitor, and the smoothing capacitor is disposed on the control board, which, of the control board and the power system board disposed at the upper and lower positions in the inverter module, is the one disposed at the upper side, the smoothing capacitor can be accommodated in the inverter module using a space on the control board. This can therefore make the inverter more compact.

Furthermore, in the inverter according to the first aspect of the present invention, preferably, at lead-wire solder portions, the P-N terminals and/or the plurality of connection terminals of the terminal block are provided with swaged portions, at which the lead wires of the common mode coil and/or the normal mode coil are swaged.

With this configuration, since the P-N terminals of the inverter module and/or the plurality of connection-terminal solder portions of the terminal block, to which the lead wires of the common mode coil and the normal mode coil are connected, are provided with swaged portions at which the lead wires are swaged, the lead wires of the common mode coil and/or the normal mode coil can be swaged and then soldered to the solder portions. This can therefore ensure and strengthen the solder joint to enhance the reliability and facilitate the soldering work itself.

Furthermore, an integrated-inverter electric compressor according to a second aspect of the present invention is provided with an inverter accommodating section on the periphery of a housing, in which the inverter according to one of the above is integrally incorporated in the inverter accommodating section.

According to the second aspect of the present invention, since the inverter according to one of the above is integrally incorporated in the inverter accommodating section provided on the periphery of the housing, the volume of the inverter accommodating section can be reduced by an amount corresponding to the size-reduction of the inverter. This can therefore reduce the size of the integrated-inverter electric compressor itself and improve the ease of installation in vehicles.

Furthermore, in the integrated-inverter electric compressor according to the second aspect of the present invention, preferably, the inverter accommodating section is divided into a first inverter accommodating section in which the inverter module is accommodated and a second inverter accommodating section in which the noise reducing coil is accommodated.

With this configuration, since the inverter accommodating section is divided into the first inverter accommodating section in which the inverter module is accommodated and the second inverter accommodating section in which the noise reducing coil is accommodated, the flexibility of placement of the inverter accommodating section provided on the periphery of the housing can be increased. This allows the first inverter accommodating section that accommodates the inverter module having a large planar area and the second inverter accommodating section that accommodates the noise reducing coil, which is a high-voltage component, to be individually disposed at the most suitable positions to make the integrated-inverter electric compressor itself compact, and can reduce the influence of self noise due to the high-voltage components, thereby enhancing the reliability.

Furthermore, in the integrated-inverter electric compressor according to the second aspect of the present invention, preferably, the first inverter accommodating section is provided on the upper surface of the housing, and the second inverter accommodating section is provided at a side of the housing.

With this configuration, since the first inverter accommodating section is provided on the upper surface of the housing, and the second inverter accommodating section is provided at a side of the housing, the separated first inverter accommodating section and second inverter accommodating section can be disposed next to each other. Accordingly, this allows the electrical connections between the inverter module accommodated in the first inverter accommodating section and the noise reducing coil and so on accommodated in the second inverter accommodating section to be made easily, and the inverter to be incorporated compactly in a distributed manner so as to surround the periphery of the housing, thus further reducing the external form of the integrated-inverter electric compressor.

Advantageous Effects of Invention

With the inverter according to the first aspect of the present invention, since the electrical connections among the inverter module, the smoothing capacitor, and the noise reducing coil can be made without a relay busbar by using the output lead wire of the noise reducing coil, this can therefore achieve a no-busbar configuration to simplify the manufacturing process, such as the mounting process, due to a decrease in solder portions, fewer restrictions in mounting the inverter in terms of insulating performance (an increase in creeping distance), reduction in the size of the inverter, and enhanced noise reducing function by reducing the distance to the inverter module, which is a noise source, and reducing the cost by eliminating the busbar.

With the integrated-inverter electric compressor according to the second aspect of the present invention, since the volume of the inverter accommodating section, that is, the external form of the housing, can be reduced by an amount corresponding to the size-reduction of the inverter, the size of the integrated-inverter electric compressor itself can be reduced, and the ease of installation in vehicles can be improved.

DESCRIPTION OF EMBODIMENTS

Figure 1:
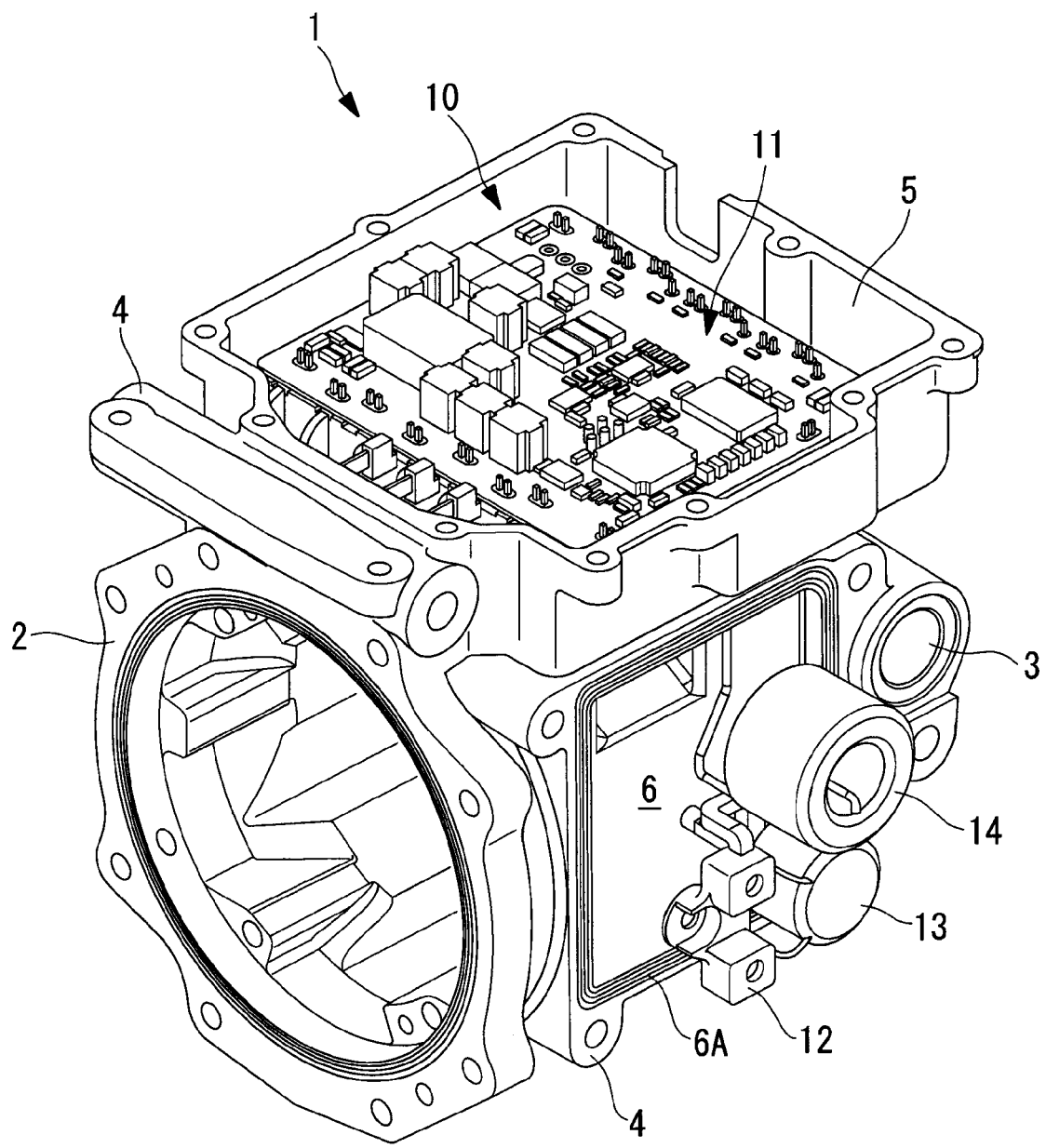
FIG. 1 is an external perspective view of the principal parts of an inverter and an integrated-inverter electric compressor according to a first embodiment of the present invention.

Embodiments according to the present invention will be described hereinbelow with reference to the drawings.

{First Embodiment}

A first embodiment of the present invention will be described below using FIGS. 1 to 8B.

An integrated-inverter electric compressor 1 includes a cylindrical housing 2 that forms the outer shell thereof. The housing 2 is configured such that a motor housing accommodating an electric motor and a compressor housing accommodating a compression mechanism, the housings being formed by aluminum die casting, are fastened together with bolts. In this embodiment, only the motor housing side is illustrated.

The electric motor and the compression mechanism (not shown) accommodated in the housing 2 are joined together via a motor shaft and are configured such that the compression mechanism is driven by the rotation of the electric motor. A refrigerant intake port 3 is provided at the rear end of the housing (motor housing) 2 (at the right in FIG. 1), and low-pressure refrigerant gas taken into the housing 2 through the refrigerant intake port 3 flows around the electric motor in the direction of the motor axis and is then taken into the compression mechanism, where it is compressed. The high-temperature, high-pressure refrigerant gas compressed by the compression mechanism is discharged into the housing (compressor housing) 2 and is then expelled outside through a discharge port (not shown) provided at the front end of the housing (compressor housing) 2.

The housing 2 has mounting legs 4 at three positions, for example, on the bottom at the rear end, on the bottom at the front end, and on the top. The integrated-inverter electric compressor 1 is installed in a vehicle by being fixed to a bracket that is provided on a side wall or the like of the vehicle via the mounting legs 4 with bolts or the like. The integrated-inverter electric compressor 1 is generally cantilevered at three upper and lower points, with one side surface disposed along the bracket and the motor axis oriented in the front-to-back direction or the left-to-right direction of the vehicle.

A first inverter accommodating section 5 that is substantially rectangular in plan view is integrally formed on the top of the peripheral surface of the housing 2. This first inverter accommodating section 5 has a box structure that is open at the top and is surrounded by a peripheral wall with a predetermined height and is configured such that an inverter module 11 of an inverter 10, to be described later, is accommodated therein, and the top is sealed with a cover (not shown).

A flange 6A that constitutes a second inverter accommodating section 6 is integrally formed on a side surface of the housing 2, and the flange 6A is securely mated with a small case (not shown), with fastening bolts, that constitutes the second inverter accommodating section 6 accommodating high-voltage components of the inverter 10, such as a terminal block 12 and a common mode coil 13 and normal mode coil 14 serving as noise reducing coils, to be described later. The second inverter accommodating section 6 and the first inverter accommodating section 5 communicate with each other, at the housing 2 side, for power line wiring.

The inverter 10 accommodated in the two-divided first inverter accommodating section 5 and second inverter accommodating section 6 is constituted by the inverter module 11 accommodated in the first inverter accommodating section 5, and the high-voltage components connected to the power lines, such as the terminal block 12, the common mode coil (noise reducing coil) 13, and the normal mode coil (noise reducing coil) 14, accommodated in the second inverter accommodating section 6.

Figure 2:
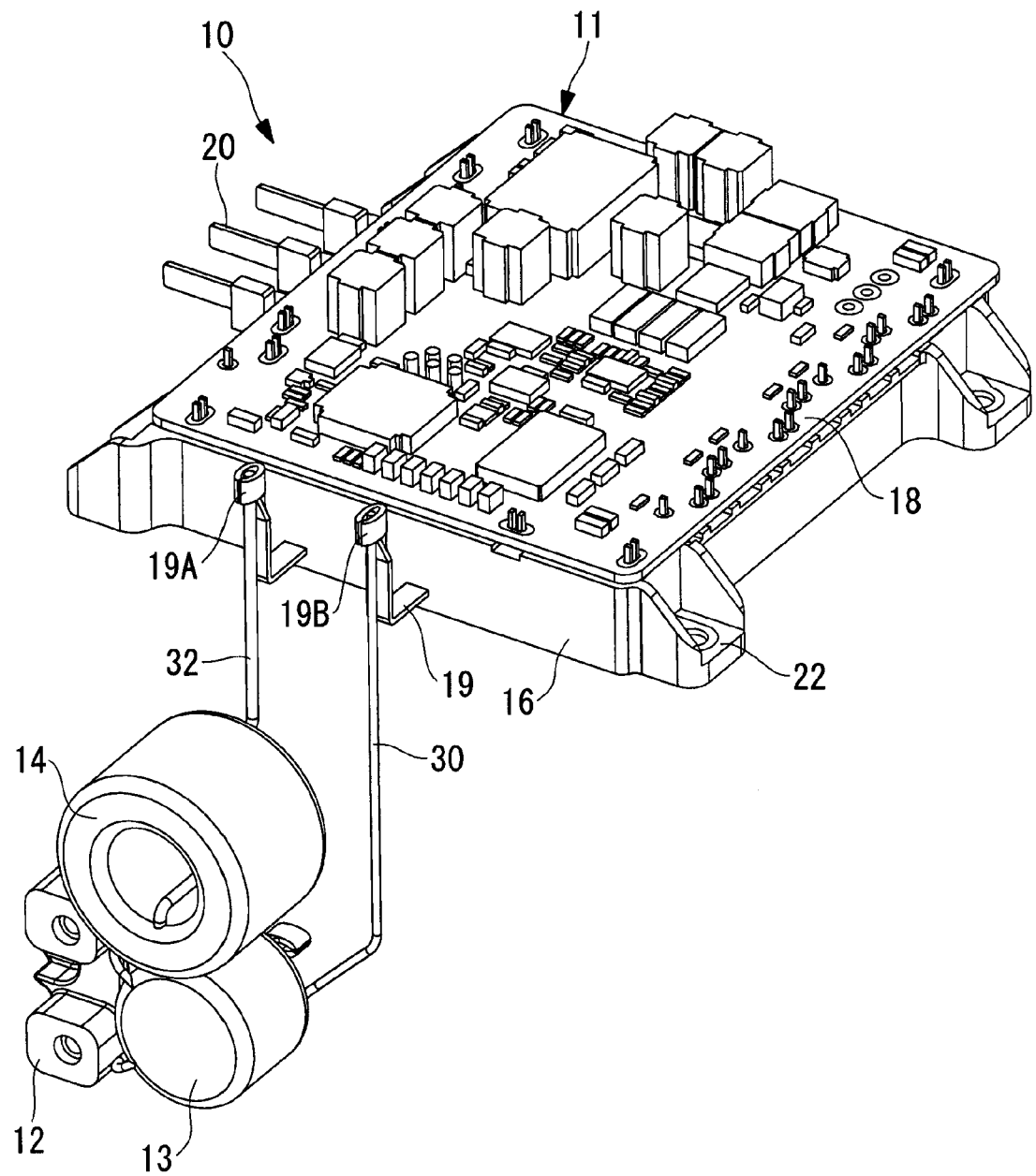
FIG. 2 is an external perspective view of the inverter incorporated in the integrated-inverter electric compressor shown in FIG. 1.
Figure 3:
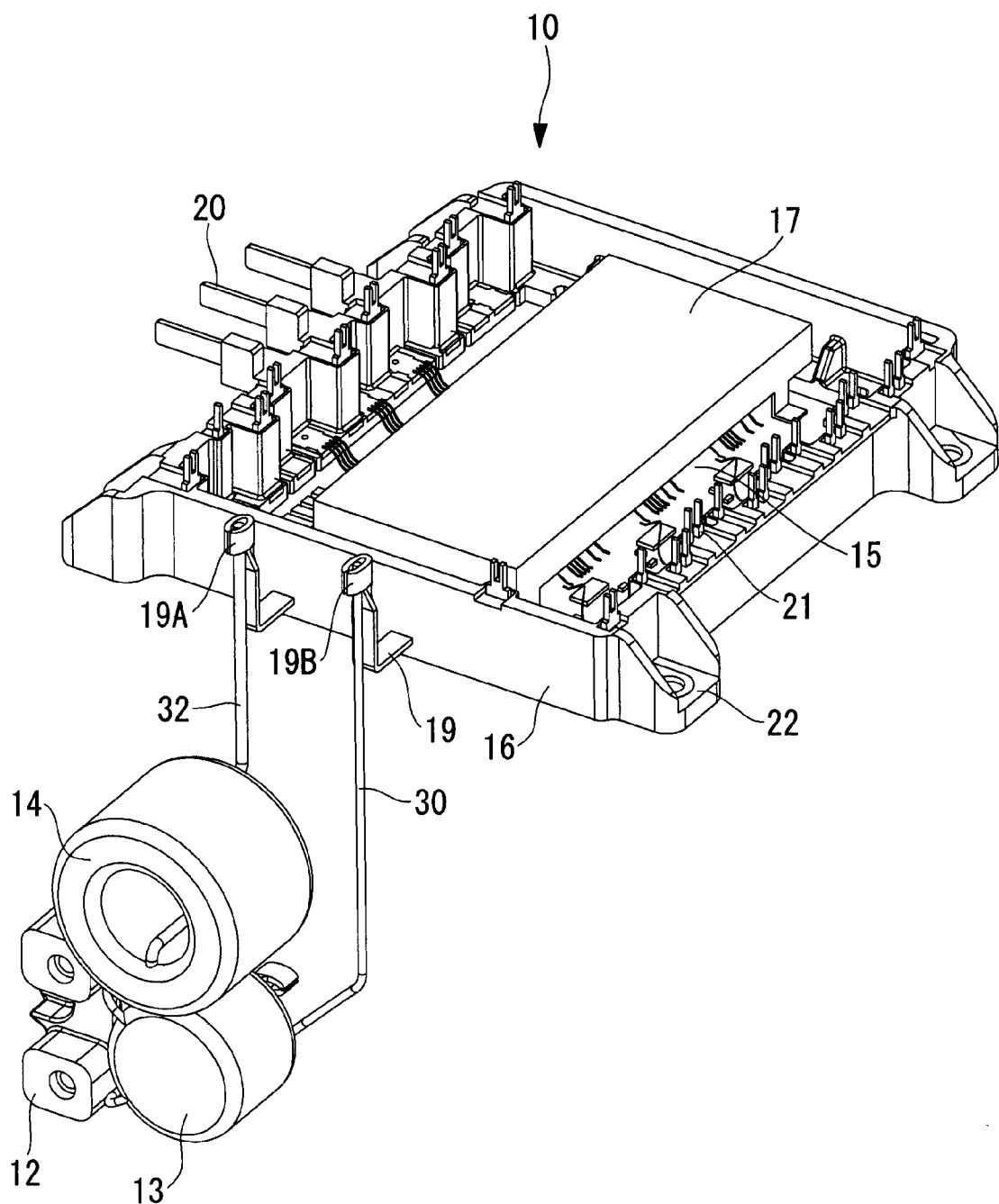
FIG. 3 is an external perspective view of the inverter shown in FIG. 2, with the control board removed.

As shown in FIGS. 2 and 3, the inverter module 11 includes a power system board 15 formed of an aluminum plate or the like on which a switching circuit constituted by a plurality of semiconductor switching devices, such as IGBTs, and so on are installed and which converts DC power to three-phase AC power and applies the power to the electric motor; a plastic case 16 in which the power system board 15 is integrated by insert forming; a smoothing capacitor (head capacitor) 17 disposed on the power system board 15 and electrically connected to the power lines in parallel with the power system board 15; and a control board 18 on which a control and communication circuit or the like constituted by devices operated at a low voltage, such as a CPU, is mounted and which controls AC power applied to the electric motor.

The plastic case 16 has, in addition to the power system board 15, a pair of P-N terminals 19 to which the power lines are connected, U-V-W terminals 20 that apply three-phase AC power to the electric motor via glass-sealed terminals, and a large number of connection terminals 21 that connect between the power system board 15 and the control board 18, which are integrated by insert forming, and the control board 18 is disposed on the top of the plastic case 16 via the large number of connection terminals 21. Examples of the smoothing capacitor 17 include a flat thin-film capacitor in which plastic films are laminated or a flat thin ceramic capacitor.

The plastic case 16 has a substantially rectangular shape and has the P-N terminals 19 protruding from one side next to the second inverter accommodating section 6 and has the U-V-W terminals 20 protruding from a front side next thereto. Furthermore, securing legs 22 that are fastened to the bottom of the inverter accommodating section 5 with bolts are integrally formed at the four corners of the plastic case 16, and the inverter module 11 is fixed inside the inverter accommodating section 5 with the securing legs 22.

Figure 5A:
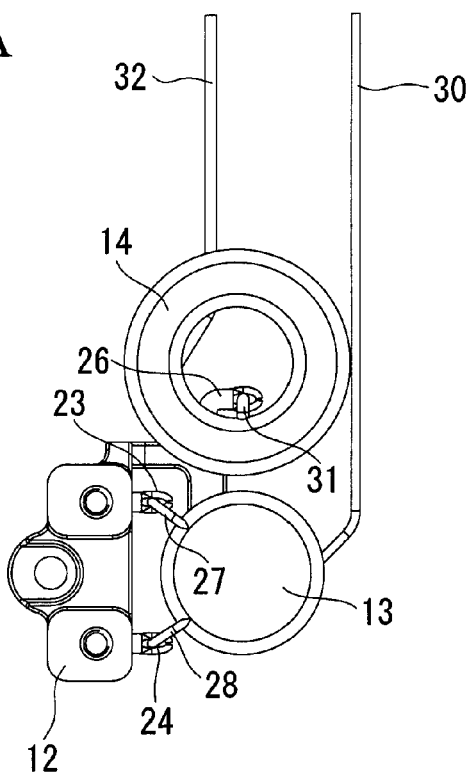
FIG. 5A is a front view of the terminal block and the high-voltage components of the inverter shown in FIG. 2.
Figure 5B:
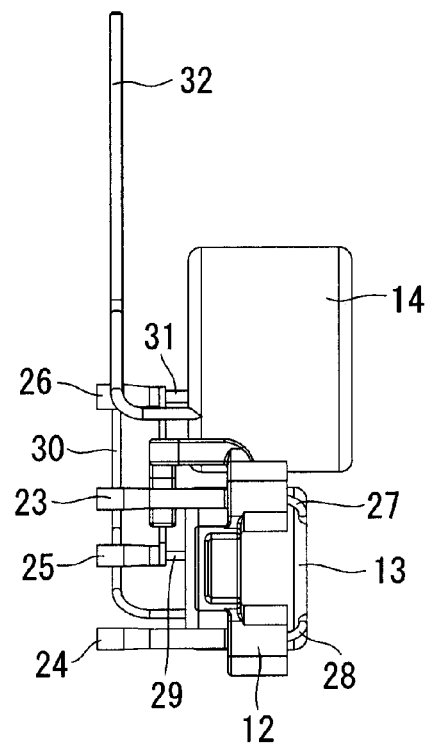
FIG. 5B is a side view of the terminal block and the high-voltage components of the inverter shown in FIG. 2.
Figure 6A:
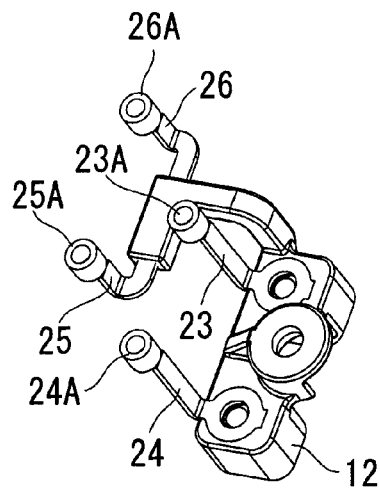
FIG. 6A is a perspective view of the terminal block and the high-voltage components of the inverter shown in FIG. 2.
Figure 6B:
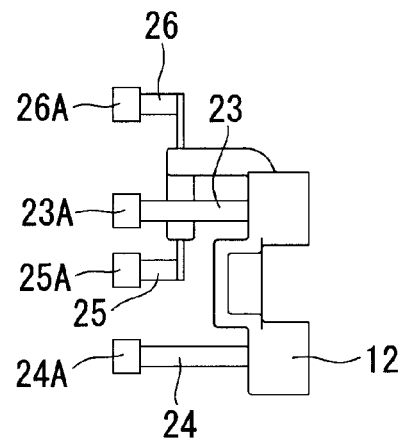
FIG. 6B is a front view of the terminal block and the high-voltage components of the inverter shown in FIG. 2.
Figure 6C:
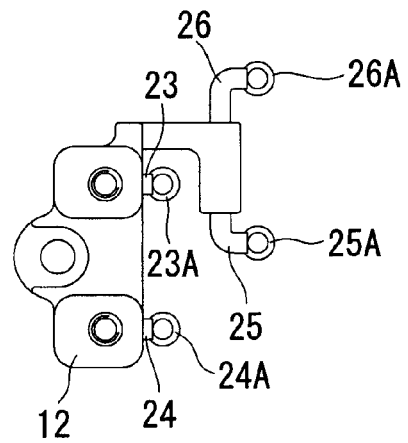
FIG. 6C is a side view of the terminal block and the high-voltage components of the inverter shown in FIG. 2.

The terminal block 12, the common mode coil 13, and the normal mode coil 14, which are high-voltage components, accommodated in the second inverter accommodating section 6 are mounted via the terminal block 12, as shown in FIGS. 5A and 5B, and are thereafter incorporated in the second inverter accommodating section 6. As shown in FIGS. 6A to 6C, the terminal block 12 is a plastic member configured such that connectors of P-side and N-side power cables can be connected thereto with bolts, and this terminal block 12 is provided with four, first to fourth, connection terminals 23 to 26 so as to protrude from the main body.

The first connection terminal 23 and the second connection terminal 24 are integrated with terminals to which connectors of two power cables are connected so that two input lead wires 27 and 28 of the common mode coil 13 are connected thereto, respectively. The third connection terminal 25 and the fourth connection terminal 26 are connected together. The third connection terminal 25 is connected to one lead wire 29 of two output lead wires 29 and 30 of the common mode coil 13, and the fourth connection terminal 26 is connected to an input lead wire 31 of the normal mode coil 14. The soldered connections of the first to fourth connection terminals 23 to 26 to the respective lead wires 27 to 29 and 31 of the common mode coils 13 and the normal mode coil 14 are provided with cylindrical swaged portions 23A to 26A where the individual lead wires are swaged.

Figure 7A:
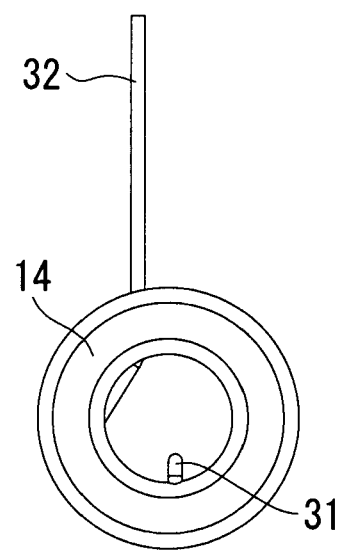
FIG. 7A is a front view of the normal mode coil of the inverter shown in FIG. 2.
Figure 7B:
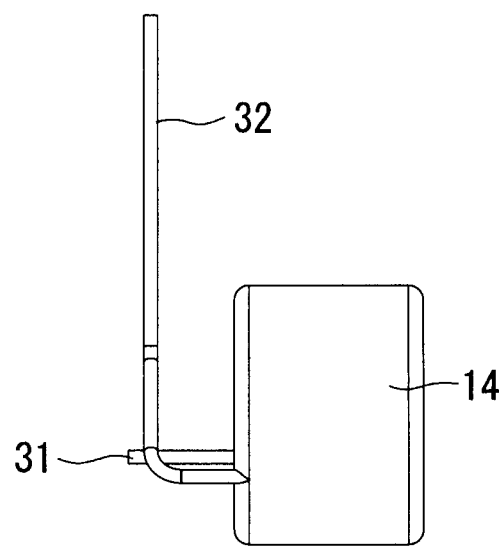
FIG. 7B is a side view of the normal mode coil of the inverter shown in FIG. 2.
Figure 8A:
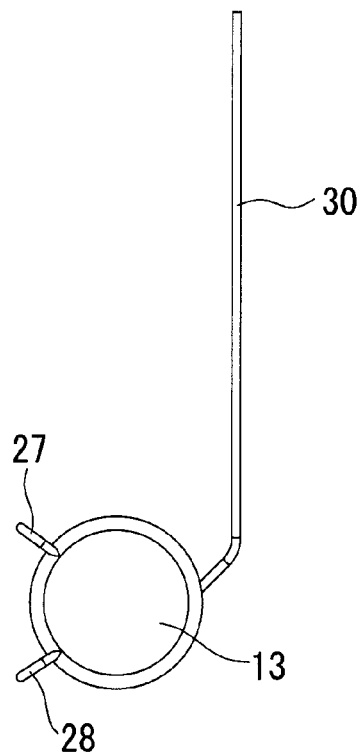
FIG. 8A is a front view of the common mode coil of the inverter shown in FIG. 2.
Figure 8B:
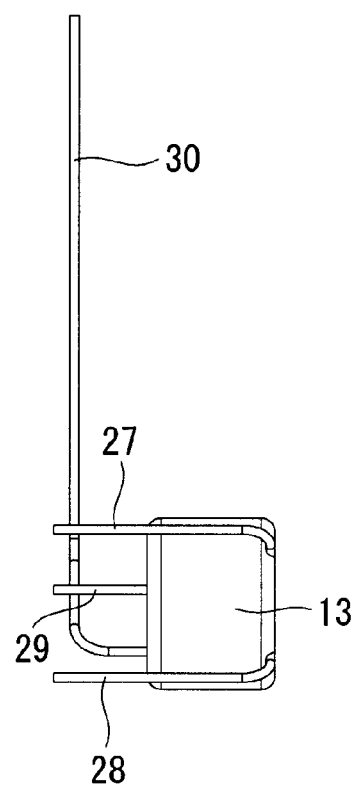
FIG. 8B is a side view of the common mode coil of the inverter shown in FIG. 2.

The common mode coil (noise reducing coil) 13 is formed into a cylindrical shape by winding two wires around one core formed of ferrite, an amorphous material, or the like and has the two input lead wires 27 and 28 and the two output lead wires 29 and 30, as shown in FIG. 8A and FIG. 8B. The normal mode coil (noise reducing coil) 14 is formed by winding a wire around a ring-shaped core and has the input lead wire 31 and an output lead wire 32, as shown in FIG. 7A and FIG. 7B. Furthermore, the pair of P-N terminals 19 at the inverter module 11 side are provided with cylindrical swaged portions 19A and 19B at which the output lead wire 32 of the normal mode coil 14 and the output lead wire 30 of the common mode coil 13 are swaged.

Figure 4:
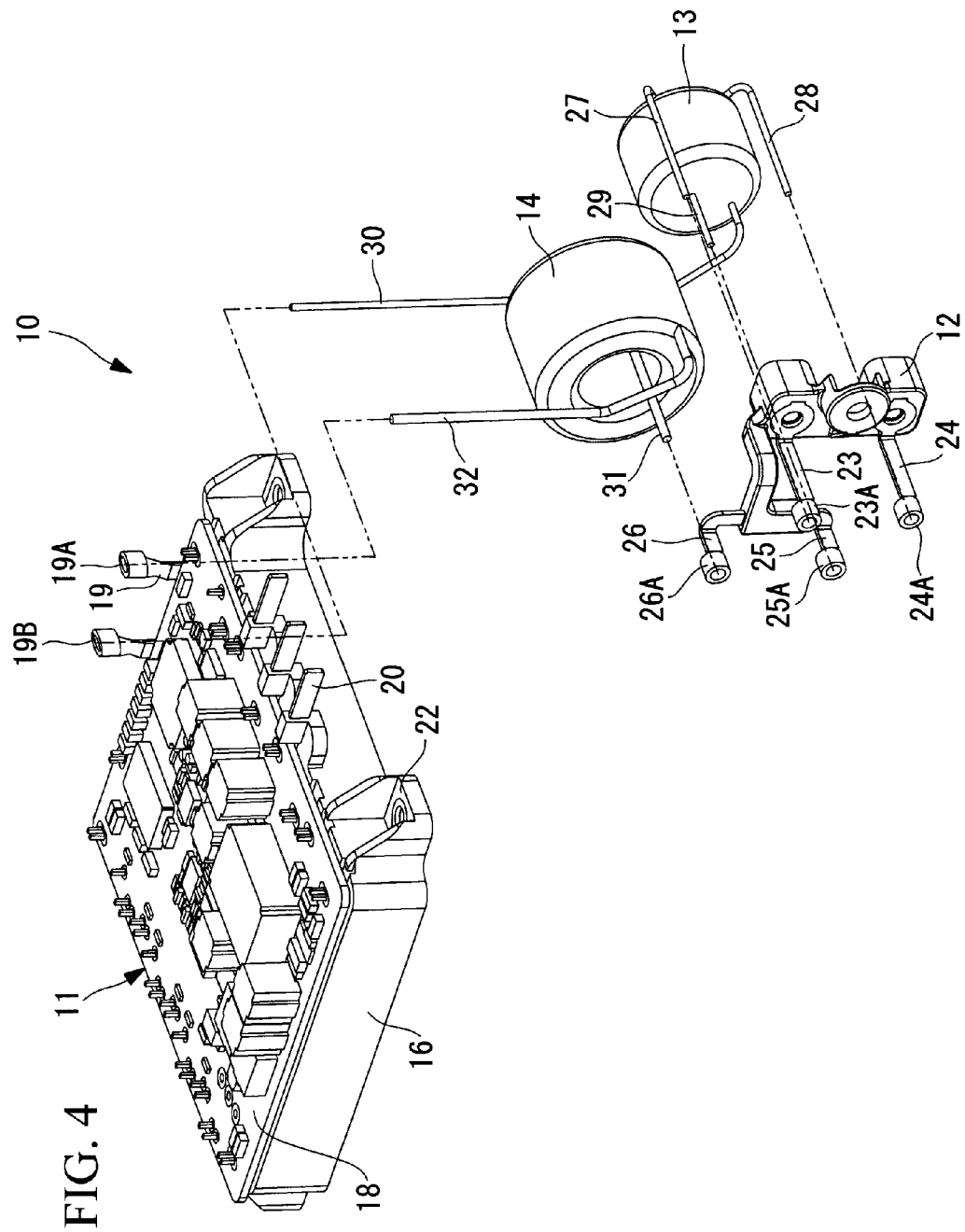
FIG. 4 is an exploded perspective view of a terminal block and high-voltage components of the inverter shown in FIG. 2, as viewed from another angle.

As shown in FIG. 4, the terminal block 12, the common mode coil 13, the normal mode coil 14, and the inverter module 11 are configured such that the input lead wires 27 and 28 of the common mode coil 13 are swaged and soldered to the swaged portions 23A and 24A of the first connection terminal 23 and the first connection terminal 24 of the terminal block 12, respectively, to which the P-side and N-side power cables are connected, and the output lead wire 29 of the common mode coil 13 and the input lead wire 31 of the normal mode coil 14 are swaged and soldered to the swaged portions 25A and 26A of the third connection terminal 25 and the fourth connection terminal 26, respectively.

Furthermore, the other output lead wire 30 of the common mode coil 13 and the output lead wire 32 of the normal mode coil 14 are routed through a communicating portion that communicates from the second inverter accommodating section 6 to the first inverter accommodating section 5 and are swaged and soldered to the swaged portions 19B and 19A of the pair of P-N terminals 19 of the inverter module 11 at the first inverter accommodating section 5 side so as to be electrically connected to the power lines.

With the configuration described above, this embodiment provides the following operational advantages.

High-voltage DC power supplied from a power unit installed in the vehicle to the integrated-inverter electric compressor 1 through a voltage cable is input to the terminal block 12 of the inverter 10. The DC power is input to the two input lead wires 27 and 28 of the common mode coil (noise reducing coil) 13 via the first connection terminal 23 and the second connection terminal 24 of the terminal block 12, passes through the normal mode coil (noise reducing coil) 14, and is then input to the pair of P-N terminals 19 at the inverter module 11 side through the output lead wire 30 of the common mode coil 13 and the output lead wire 32 of the normal mode coil 14.

The DC power input to the P-N terminals 19 of the inverter module 11 is input to the switching circuit on the power system board 15 through the smoothing capacitor 17, during which common-mode noise and current ripples are reduced by the common mode coil 13, the normal mode coil 14, and the smoothing capacitor 17. The DC power input to the power system board 15 is converted to three-phase AC power with an instructed frequency by the switching operation of the semiconductor switching devices on the power system board 15 controlled on the basis of a command signal transmitted from a higher-level control unit to the control board 18. The three-phase AC power is applied from the U-V-W terminals 20 connected to the power system board 15 to the electric motor in the housing 2 through the glass-sealed terminals. Thus, the electric motor is rotationally driven at the instructed frequency to operate the compression mechanism.

By the operation of the compression mechanism, low-temperature refrigerant gas is taken into the housing (motor housing) 2 through the refrigerant intake port 3. The refrigerant flows around the electric motor in the direction of the motor axis and is taken into the compression mechanism, where it is compressed to a high-temperature, high-pressure state and is then discharged into the housing (compressor housing) 2 and is expelled to the outside of the electric compressor 1 through the discharge port. During this process, the low-temperature, low-pressure refrigerant gas taken in through the refrigerant intake port 3 to one end of the housing (motor housing) 2 and made to flow in the direction of the motor axis forcedly cools the heat-generating components, such as the semiconductor switching devices (IGBTs) and high-voltage components, accommodated in the first and second inverter accommodating sections 5 and 6 via the wall surface of the housing 2, thereby enhancing the heat-resisting performance of the components.

In the inverter 10, of the common mode coil 13, the normal mode coil 14, and the smoothing capacitor 17 connected to the power lines, the smoothing capacitor 17 is electrically connected to the power lines on the inverter module 11 in parallel with the power system board 15. The common mode coil 13 and the normal mode coil 14 are connected to the power line by directly connecting the input lead wires 27, 28, and 31 and the output lead wire 29 to the first to fourth connection terminals 23, 24, 25, and 26 provided at the terminal block 12 to which power cables are connected and by directly connecting the output lead wire 30 of the common mode coil and the output lead wire 32 of the normal mode coil to the pair of P-N terminals 19 at the inverter module 11 side.

Thus, by disposing the smoothing capacitor 17 on the inverter module 11 and directly connecting the output lead wires 30 and 32 of the common mode coil 13 and the normal mode coil 14 to the pair of P-N terminals 19 at the inverter module 11 side, the electrical connections among the inverter module 11, the smoothing capacitor 17, and the normal mode coil 14 and the common mode coil 13, which are noise reducing coils, can be made without a relay busbar. This can therefore achieve a no-busbar configuration to simplify the manufacturing process, such as the mounting process, due to a decrease in solder portions, fewer restrictions in mounting the inverter in terms of insulating performance (an increase in creeping distance), reduction in the size of the inverter, and enhanced noise reducing function by reducing the distance to the inverter module 11, which is a noise source, and reduction of the cost by eliminating the busbar.

Furthermore, since the common mode coil 13 and the normal mode coil 14 are connected to the power lines in such a manner that the two input lead wires 27 and 28 of the common mode coil 13 are connected thereto, and the output lead wire 29 of the common mode coil 13 and the input lead wire 31 of the normal mode coil 14 are electrically connected via the plurality of first to fourth connection terminals 23 to 26 of the terminal block 12 to which the power cables are connected, the electrical connections among the inverter module 11, the smoothing capacitor 17, the normal mode coil 14, and the common mode coil 13 can be made without a relay busbar by using the terminal block 12 and the input and output lead wires 27 to 32 of the noise reducing coils 13 and 14. Accordingly, the relay busbar between the terminal block 12 to which the power cables are connected and the P-N terminals 19 of the inverter module 11 can be completely eliminated, and thus, a no-busbar configuration can be achieved.

Furthermore, since a flat thin-film capacitor in which, for example, plastic films are laminated, is used as the smoothing capacitor 17, and the smoothing capacitor 17 is accommodated in the inverter module 11 using the space between the control board 18 and the power system board 15 disposed at upper and lower sides in the inverter module 11, the inverter 10 can be made more compact. This can reduce the volume of the first inverter accommodating section 5 and the second inverter accommodating section 6 provided on the periphery of the housing 2, thereby reducing the size of the integrated-inverter electric compressor 1 itself and improving the ease of installation in vehicles.

Furthermore, since the solder portions of the first to fourth connection terminals 23 to 26 of the terminal block 12 to which the lead wires 27 to 32 of the common mode coil 13 and the normal mode coil 14, which are noise reducing coils, are connected, and the P-N terminals 19 of the inverter module 11 are provided with the cylindrical swaged portions 23A to 26A and swaged portions 19A and 19B in which the individual lead wires 27 to 32 are inserted and swaged, and the lead wires 27 to 32 of the common mode coil 13 and the normal mode coil 14 are swaged and then soldered to the solder portions, a solder joint can be ensured and strengthened, and thus, the reliability can be enhanced and the soldering work itself can be made easy.

Furthermore, since the inverter accommodating section is divided into the first inverter accommodating section 5 in which the inverter module 11 is accommodated and the second inverter accommodating section 6 in which the terminal block 12, the common mode coil 13, and the normal mode coil 14 are accommodated, the first inverter accommodating section 5 is provided on the top of the housing 2, and the second inverter accommodating section 6 is provided on the side of the housing 2 so that they are disposed next to each other, the first inverter accommodating section 5 that accommodates the inverter module 11 having a large planar area and the second inverter accommodating section 6 that accommodates the high-voltage components, i.e. the terminal block 12, the common mode coil 13, and the normal mode coil 14, can be individually disposed at the most suitable positions, and thus, the integrated-inverter electric compressor 1 itself can be made compact, and an influence of self noise due to the high-voltage components can be reduced, and thus, reliability can be enhanced.

Furthermore, since the inverter module 11 accommodated in the first inverter accommodating section 5 and the common mode coil 13 and the normal mode coil 14 accommodated in the second inverter accommodating section 6 are disposed close to each other, the electrical connections therebetween can be easily established, and the inverter 10 can be incorporated compactly in a distributed manner so as to surround the periphery of the housing 2, and thus, the external form of the integrated-inverter electric compressor 1 can be made smaller.

{Second Embodiment}

Next, a second embodiment of the present invention will be described using FIG. 9.

This embodiment differs from the foregoing first embodiment in the placement of a smoothing capacitor (head capacitor) 17A. Since the other features are the same as those of the first embodiment, descriptions thereof will be omitted.

Figure 9:
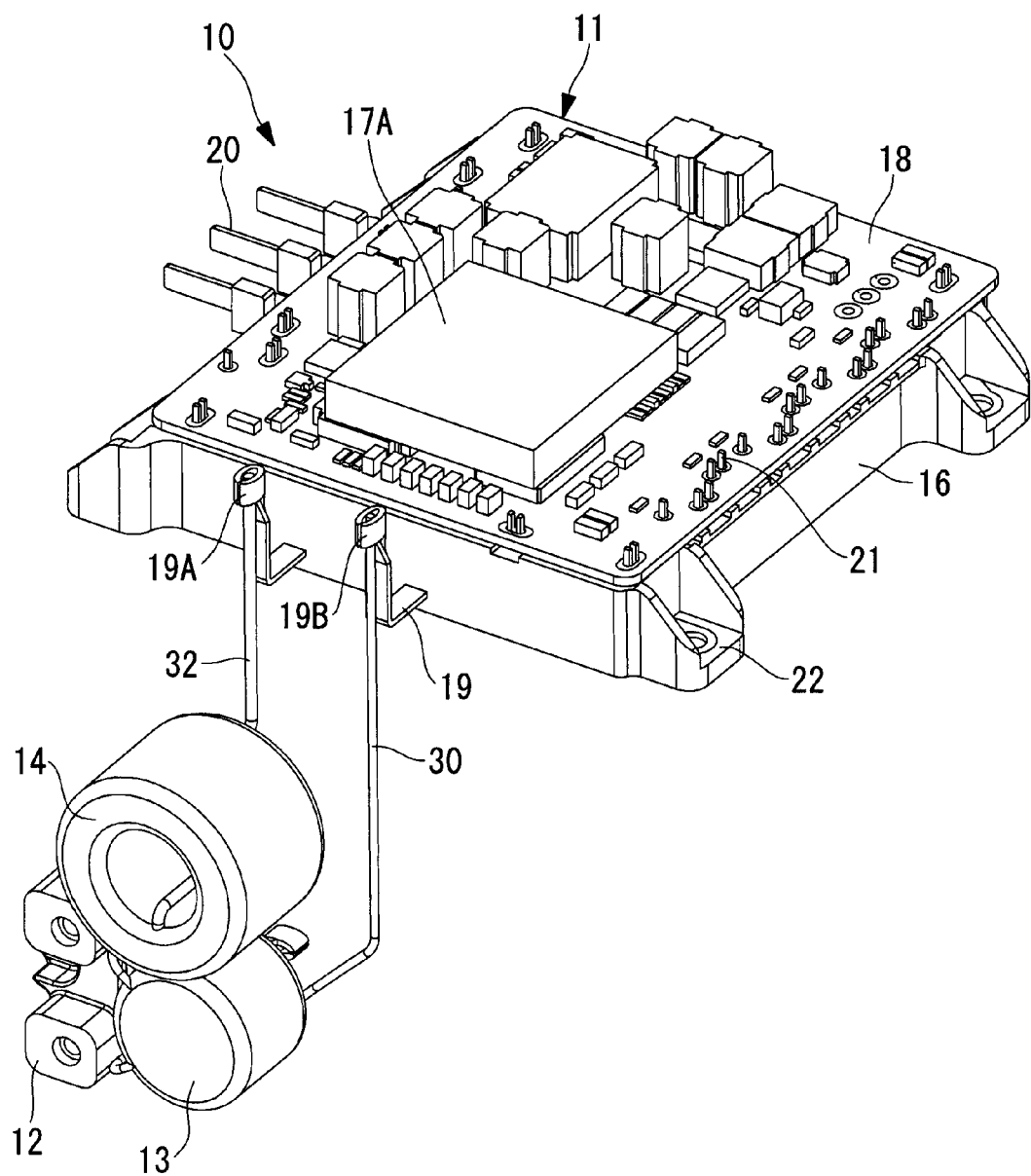
FIG. 9 is an external perspective view of an inverter according to a second embodiment of the present invention.

In this embodiment, as shown in FIG. 9, the smoothing capacitor (head capacitor) 17A is a relatively small square thin-film capacitor or thin ceramic capacitor and is disposed on the control board 18 in the inverter module 11. In this case, the smoothing capacitor 17A is disposed such that the capacitor terminals (not shown) extend downward through the control board 18 and are electrically connected to the power lines on the power system board 15 in parallel with the power system board 15.

By using, for example, a thin-film capacitor or thin ceramic capacitor as the smoothing capacitor 17A and disposing the smoothing capacitor 17A on the control board 18, which, of the control board 18 and the power system board 15 disposed at upper and lower positions in the inverter module 11, is the one disposed at the upper side, in this way, the smoothing capacitor 17A can be accommodated in the inverter module 11 using the space on the control board 18. This can also make the inverter 10 compact, thereby reducing the size of the integrated-inverter electric compressor 1 that incorporates the inverter 10 and improving the ease of installation in vehicles, as in the first embodiment described above.

{Third Embodiment}

Next, a third embodiment of the present invention will be described.

Although the foregoing first and second embodiments are configured such that the normal mode coil 14 is provided only at the P-pole side of the power lines, the normal mode coil 14 may be divided into two and may be provided also at the N-pole side, in which case, the normal mode coil 14 at the N-pole side is also provided downstream of the common mode coil 13, and thus, the P-N terminals 19 of the inverter module 11 are connected to output lead wires 32 of the normal mode coils 14 provided individually at the P-pole side and the N-pole side of the inverter module 11.

With the above configuration, the electrical connection between the other output lead wire 30 of the common mode coil 13 and the input lead wire 31 of the normal mode coil 14 at the N-pole side can be established by providing the terminal block 21 with a fifth connection terminal and a sixth connection terminal (not shown) similar to the third connection terminal 25 and the fourth connection terminal 26.

Such an embodiment can also provide the same operational advantages as those of the foregoing first and second embodiments.

The present invention is not limited to the invention according to the embodiments described above, and modifications can be made as appropriate without departing from the spirit thereof. For example, in the above embodiments, the compression mechanism of the integrated-inverter electric compressor 1 may be any type of compression mechanism. It is needless to say that the inverter 10 should be equipped with the inverter module 11 formed of the power system board 15 and the control board 18, the smoothing capacitor 17, the terminal block 12, the common mode coil 13, the normal mode coil 14 and so on and may include other electrical components. Furthermore, the noise-reducing common mode coil 13 does not necessarily need to be integrally incorporated in the electric compressor 1 side; an inverter having only the normal mode coil 14 as a noise reducing coil is also included in the present invention.

The first inverter accommodating section 5 and the second inverter accommodating section 6 that accommodate the inverter 10 may either be configured to be integrally formed with the housing 2 or be configured such that a separately formed case or the like is integrally fixed to the housing 2. Furthermore, the cylindrical swaged portions 23A to 26A and 19A and 19B, provided at the first to fourth connection terminals 23 to 26 of the terminal block 12 and/or the pair of P-N terminals 19, at which the lead wires of the common mode coil 13 and the normal mode coil 14 are swaged, do not necessarily need to be cylindrical and may have any configuration that enables the lead wires to be swaged.

Reference Sign List 1 integrated-inverter electric compressor
2 housing
5 first inverter accommodating section
6 second inverter accommodating section
10 inverter
11 inverter module
12 terminal block
13 common mode coil (noise reducing coil)
14 normal mode coil (noise reducing coil)
15 power system board
17, 17A smoothing capacitor
18 control board
19 P-N terminals
19A, 19B, 23A, 24A, 25A, 26A swaged portion
23 first connection terminal
24 second connection terminal
25 third connection terminal
26 fourth connection terminal
27, 28 input lead wire of common mode coil
29, 30 output lead wire of common mode coil
31 input lead wire of normal mode coil
32 output lead wire of normal mode coil

The invention claimed is:

1. An inverter comprising:
a noise reducing coil;
a smoothing capacitor;
an inverter module that includes P-N terminals in which DC power is input, a power system board and a control board; and
a terminal block to which power cables from a power source are connected and to which DC power supplied from the power source is input, wherein
the power system board converts the DC power which has been input to the P-N terminals to AC power and supplies the AC power to an electric motor;
the control board controls the AC power to be applied to the electric motor;
the smoothing capacitor is electrically connected, on the inverter module, in parallel with the power system board;
the noise reducing coil includes at least two coils, that is, a common mode coil and a normal mode coil;
input lead wires of the common mode coil are directly connected to the terminal block;
output lead wires of the common mode coil are directly connected to the terminal block and the P-N terminals;
an input lead wire of the normal mode coil is directly connected to the terminal block; and
an output lead wire of the normal mode coil is directly connected to the P-N terminals wherein the normal mode coil is provided, downstream of the common mode coil, at each of the P-pole side and the N-pole side.

2. The inverter according to claim 1, wherein the smoothing capacitor is disposed on the power system board, which, of the control board and the power system board disposed at the upper and lower positions in the inverter module, is the one disposed at the lower side.

3. The inverter according to claim 1, wherein the smoothing capacitor is disposed on the control board, which, of the control board and the power system board disposed at the upper and lower positions in the inverter module, is the one disposed at the upper side.

4. The inverter according to claim 1, wherein
the terminal block has a plurality of connection terminals;
the P-N terminals and/or the plurality of connection terminals are provided with swaged portions at lead-wire solder portions to which the lead wires of the common mode coil and/or the normal mode coil are connected; and
the swaged portions swages the lead wires of the common mode coil and/or the normal mode coil.

5. An integrated-inverter electric compressor provided with an inverter accommodating section on the periphery of a housing, in which the inverter according to claim 1 is integrally incorporated in the inverter accommodating section.

6. The integrated-inverter electric compressor according to claim 5, wherein the inverter accommodating section is divided into a first inverter accommodating section in which the inverter module is accommodated and a second inverter accommodating section in which the noise reducing coil is accommodated.

7. The integrated-inverter electric compressor according to claim 6, wherein the first inverter accommodating section is provided on the upper surface of the housing, and the second inverter accommodating section is provided at a side of the housing.

* * * * *